(12) United States Patent
Sugiyama

(10) Patent No.: US 8,653,164 B2
(45) Date of Patent: Feb. 18, 2014

(54) INORGANIC BOARD AND MANUFACTURING METHOD THEREOF

(75) Inventor: Naoki Sugiyama, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 95 days.

(21) Appl. No.: 13/272,332

(22) Filed: Oct. 13, 2011

(65) Prior Publication Data

US 2012/0237784 A1   Sep. 20, 2012

(30) Foreign Application Priority Data

Mar. 16, 2011 (JP) ................................. 2011-057411

(51) Int. Cl.
*C08L 97/02* (2006.01)

(52) U.S. Cl.
USPC ........................................................ 524/13

(58) Field of Classification Search
USPC ........................................................... 524/13
See application file for complete search history.

(56) References Cited

U.S. PATENT DOCUMENTS

| | | | | |
|---|---|---|---|---|
| 5,676,748 A | * | 10/1997 | Brown | 106/469 |
| 5,863,477 A | * | 1/1999 | Kawai | 264/82 |
| 6,616,807 B1 | * | 9/2003 | Dyllick-Brenzinger et al. | 162/175 |
| 2007/0186822 A1 | * | 8/2007 | Utagaki et al. | 106/805 |
| 2007/0245930 A1 | * | 10/2007 | Utagaki et al. | 106/716 |
| 2009/0025897 A1 | * | 1/2009 | Aizawa | 162/181.6 |
| 2010/0310893 A1 | * | 12/2010 | Derbyshire et al. | 428/528 |
| 2011/0306255 A1 | * | 12/2011 | Rathenow | 442/1 |

FOREIGN PATENT DOCUMENTS

| | | |
|---|---|---|
| JP | 2008-239446 A | 10/2008 |
| WO | WO 2009121888 A1 * | 10/2009 |

OTHER PUBLICATIONS

Rathi, M. S., et al. "Application of polyallylamine as a dry strength agent for paper," TAPPI Journal, Dec. 2000, 1-8.*

* cited by examiner

*Primary Examiner* — Liam Heincer
*Assistant Examiner* — Nicholas Hill
(74) *Attorney, Agent, or Firm* — Birch, Stewart, Kolasch & Birch, LLP

(57) ABSTRACT

An inorganic board is formed of an aluminosilicate setting material, a wooden reinforcing material and an aggregating agent. The wooden reinforcing material is covered by the aggregating agent, and this agent is covered by the aluminosilicate setting material. A method of manufacturing the inorganic board has the steps of covering a wooden reinforcing material with an aggregating agent; producing a starting material mixture by mixing the thus-obtained wooden reinforcing material with an aluminosilicate powder, an alkali metal hydroxide and water glass; and molding and curing the thus-obtained starting material mixture.

10 Claims, No Drawings

INORGANIC BOARD AND MANUFACTURING METHOD THEREOF

BACKGROUND OF THE INVENTION

1. Field of the Invention

The present invention relates to an inorganic board suitable for building boards, and to a method of manufacturing of the inorganic board.

2. Description of the Related Art

Compositions that comprise an aluminosilicate setting material and an aggregate, as starting materials, are known in the art. For instance, Japanese Patent Application Publication No. 2008-239446 discloses a composition comprising fly ash, an alkaline activator, and an aggregate and discloses a method of manufacturing the composition. The described composition can be used in construction, civil engineering and structure formation.

However, the composition disclosed in Japanese Patent Application Publication No. 2008-239446 has high specific gravity and small deflection, and hence is not suitable for use in building boards. A fibrous reinforcing material is required in order to lower the specific gravity and improve deflection. However, synthetic fibers are expensive, and contribute little to lowering the specific gravity. By contrast, wooden reinforcing materials are inexpensive and are suited for lowering specific gravity.

When producing a composition through addition of a wooden reinforcing material, however, problems arise in that, after setting, colored materials that come into contact with water leach into the latter, giving rise to contamination. This is deemed to arise from extraction of lignin and other components from wood as a result of contact between the wooden reinforcing material and the alkaline activator. The extracted components leach thereupon to the surface of the composition. In consequence, it is difficult to use a composition containing an aluminosilicate setting material and a wooden reinforcing material in building boards, for instance outer siding boards that are exposed to rain and the like, and inner wall boards where contact with water might be likely.

SUMMARY OF THE INVENTION

Therefore, it is an object of the present invention to provide an inorganic board, and a manufacturing method thereof, in which the inorganic board boasts low specific gravity and substantial deflection, and in which extraction and leaching of components from a wooden reinforcing material are suppressed even if the inorganic board contains an aluminosilicate setting material and a wooden reinforcing material.

The present invention provides an inorganic board. The inorganic board comprises an aluminosilicate setting material, a wooden reinforcing material and an aggregating agent. The wooden reinforcing material is covered by the aggregating agent, and the latter is covered by the aluminosilicate setting material. As a result, the inorganic board has low specific gravity, and component extraction and leaching from the wooden reinforcing material are suppressed, even when the inorganic board comes into contact with water. Preferably, the inorganic board comprises polyallylamine as the aggregating agent, since in that case extraction and leaching of components from the wooden reinforcing material are suppressed to the greatest extent. Preferably, the aggregating agent content ranges from 1 to 30 wt %, on solids basis, with respect to the wooden reinforcing material, since in that case the wooden reinforcing material becomes reliably covered by the aggregating agent, and there are suppressed extraction and leaching of components from the wooden reinforcing material. More preferably, the aluminosilicate setting material content ranges from 30 to 98.95 wt % with respect to total solids, the wooden reinforcing material content ranges from 1 to 30 wt % with respect to total solids, and the aggregating agent content ranges from 0.05 to 9 wt % with respect to total solids. Herein, low specific gravity denotes a specific gravity lower than 1.5.

The present invention provides also a method of manufacturing an inorganic board. The manufacturing method comprises the steps of covering a wooden reinforcing material with an aggregating agent; producing a starting material mixture by mixing the thus-obtained wooden reinforcing material with an aluminosilicate powder, an alkali metal hydroxide and water glass; and molding and curing the thus-obtained starting material mixture. In the above manufacturing method, preferably, the aggregating agent is polyallylamine, since in that case extraction and leaching of components from the wooden reinforcing material are suppressed to the greatest extent. In the step of covering the wooden reinforcing material with the aggregating agent, preferably, the aggregating agent is added in an amount ranging from 1 to 30 wt %, on solids basis, to the wooden reinforcing material, since in that case the wooden reinforcing material is reliably covered by the aggregating agent, and leaching of components from the wooden reinforcing material are suppressed. More preferably, the wooden reinforcing material content ranges from 1 to 30 wt % with respect to total solids, the aggregating agent content ranges from 0.05 to 9 wt % with respect to total solids, and the sum total of the aluminosilicate powder, the alkali metal hydroxide and water glass ranges from 30 to 98.95 wt % with respect to total solids. Preferably, the water content of the starting material mixture ranges from 5 to 30 wt % on total solids basis, since such a range is favorable for molding.

The present invention succeeds in providing an inorganic board, and a manufacturing method thereof, in which the inorganic board boasts low specific gravity and substantial deflection, and in which extraction and leaching of components from a wooden reinforcing material are suppressed even if the inorganic board contains an aluminosilicate setting material and a wooden reinforcing material.

DESCRIPTION OF THE PREFERRED EMBODIMENTS

Specific embodiments of the present invention are explained below.

The inorganic board of the present invention comprises an aluminosilicate setting material, a wooden reinforcing material and an aggregating agent.

The aluminosilicate setting material is a reaction product of an aluminosilicate powder, an alkali metal hydroxide and water glass. Examples of the aluminosilicate powder include, for instance, fly ash, slag, metakaolin, perlite, allophane and pyrophyllite. The aluminosilicate powder may include one type alone, or two or more types, of any of the foregoing materials. Examples of the alkali metal hydroxide include, for instance, lithium hydroxide, sodium hydroxide, potassium hydroxide and the like. The alkali metal hydroxide may include one type alone, or two or more types, of any of the foregoing materials. Examples of water glass include, for instance, sodium silicate, potassium silicate and the like, as well as mixtures of sodium silicate and potassium silicate.

Examples of the wooden reinforcing material include, for instance, wood chips, waste paper, needle-leaves-tree unbleached kraft pulp (NUKP), needle-leaves-tree bleached kraft pulp (NBKP), laubholz unbleached kraft pulp (LUKP), laubholz bleached kraft pulp (LBKP) and the like. In the present invention there may be contained one type alone, or two or more types, of any of the foregoing materials.

The aggregating agent may be an organic polymer aggregating agent or an inorganic aggregating agent. Examples of organic polymer aggregating agents include, for instance, cationic aggregating agents such a polyallylamine, polyethyleneimine, quaternary ammonium salts, water-soluble aniline resins, polythiourea or the like, anionic aggregating agents such as sodium polyacrylate, sodium alginate, salts of partially hydrolyzed polyacrylamide, or maleic acid copolymers; and nonionic aggregating agents such as polyacrylamide and polyoxyethylene. Examples of inorganic aggregating agents include, for instance, aluminum sulfate, sodium aluminate, basic aluminum chloride, iron sulfate and the like. In the present invention there may be contained one type alone, or two or more types, of any of the foregoing materials. Polyallylamine is particularly preferred on account of its excellent inhibitory effect on extraction and leaching of components from the wooden reinforcing material.

Besides the abovementioned ones, other starting materials of the inorganic board include fillers such as silica sand, silica flour, silica powder, diatomaceous earth, mica, bentonite, vermiculite, foamed thermoplastic plastic beads, plastic foam, silica fume, Shirasu balloons, perlite and the like.

Preferably, the inorganic board of the present invention contains 1 to 30 wt % of aggregating agent, on solids basis, with respect to the wooden reinforcing material, since in that case the wooden reinforcing material is reliably covered by the aggregating agent, and extraction and leaching of components from the wooden reinforcing material are suppressed.

In a more preferred building board, the content of aluminosilicate setting material ranges from 30 to 98.95 wt % with respect to total solids, the content of wooden reinforcing material ranges from 1 to 30 wt % with respect to total solids, and the content of aggregating agent ranges from 0.05 to 9 wt % with respect to total solids, since in that case the specific gravity of the board is lower than 1.5, and both flexural strength and deflection are substantial.

The inorganic board of the present invention is produced in accordance with a method that comprises the steps of: covering the wooden reinforcing material with an aggregating agent, producing a starting material mixture by mixing the obtained wooden reinforcing material with an aluminosilicate powder, an alkali metal hydroxide and water glass; and molding and curing the obtained starting material mixture.

The step of covering the wooden reinforcing material with the aggregating agent can be accomplished by adding the aggregating agent to the wooden reinforcing material, under stirring. Addition of the aggregating agent to the wooden reinforcing material may be performed with the wooden reinforcing material in a dry state or a wet state. The aggregating agent can be used in a powdery state or a liquid state. Preferably, a liquid aggregating agent is added to a dry wooden reinforcing material, since covering of the wooden reinforcing material by the aggregating agent is excellent in that case. Preferably, the aggregating agent is added in an amount that ranges from 1 to 30 wt %, on solids basis, with respect to the wooden reinforcing material, since in that case the wooden reinforcing material becomes reliably covered by the aggregating agent, and there are suppressed extraction and leaching of components from the wooden reinforcing material.

The subsequent step of producing a starting material mixture is accomplished by mixing the obtained wooden reinforcing material with an aluminosilicate powder, an alkali metal hydroxide and water glass. In the step of producing the starting material mixture, preferably, the sum total of the aluminosilicate powder, the alkali metal hydroxide and water glass ranges from 30 to 98.95 wt % with respect to total solids, the wooden reinforcing material ranges from 1 to 30 wt % with respect to total solids, and the aggregating agent ranges from 0.05 to 9 wt % with respect to total solids, since in that case the specific gravity of the inorganic board is lower than 1.5, and both flexural strength and deflection are substantial. Fillers may be added as the case may require. Preferably, the water content of the starting material mixture ranges from 5 to 30 wt %, on total solids basis, since such a range is favorable for molding.

In the step of molding and curing the obtained starting material mixture, molding may involve, for instance, spreading the starting material mixture, followed by pressing or compression, or may involve pouring the starting material mixture into a frame, or extruding the starting material mixture through a die. Curing may be carried out by natural curing, or by heat curing such as steam curing, autoclave curing or the like.

Examples of the present invention are explained next.

Inorganic boards of Examples 1 to 3 and Comparative examples 1 to 3 were produced by spreading the starting material mixtures having the compositions given Table 1 on a formboard, followed by pressing and curing. In Examples 1 to 3, unbleached wood chips and liquid polyallylamine were mixed, followed by mixture with the other starting materials and adjustment of the starting material mixture. In Examples 1 and 2 and Comparative example 1, curing was performed at 80° C. for 16 hours; in Example 3 and Comparative examples 2 and 3, primary curing was performed at 80° C. for 16 hours, followed by autoclave curing at 165° C. for 12 hours. The water content in all the starting material mixtures was adjusted to 23 wt % on total solids basis, and the thickness of the inorganic boards was set to 16 mm.

The specific gravity, flexural strength and deflection of all the inorganic boards obtained in Examples 1 to 3 and Comparative examples 1 to 3 were measured, and the boards were subjected to a leaching test. The results are given in Table 1. Flexural strength and deflection were measured in accordance with JIS A 1408, but using herein 7×20 cm specimens. The leaching test is a test for characterizing, in the form of a numerical value, the degree to which the components of the wooden reinforcing material and so forth in the inorganic boards are leached into water. In the test, 1.5×6 cm specimens were placed in 200 ml of water at normal temperature, and the change of color of the water was measured after 24 hours. The numerical value of color difference is substantial when water becomes colored, and hence a greater degree of leaching of components of the wooden reinforcing material and so forth from the inorganic board, in the specimens, translates into larger color differences.

TABLE 1

|  |  |  | Example 1 | Example 2 | Example 3 | Comparative example 1 | Comparative example 2 | Comparative example 3 |
|---|---|---|---|---|---|---|---|---|
| Solids | Fly ash | % | 38.4 | 38.1 | 38.1 | 38.7 | 38.7 | 40.0 |
| composition | Silica flour | % | 38.4 | 38.1 | 38.1 | 38.7 | 38.7 | 40.0 |

TABLE 1-continued

| | | | Example 1 | Example 2 | Example 3 | Comparative example 1 | Comparative example 2 | Comparative example 3 |
|---|---|---|---|---|---|---|---|---|
| of starting material mixture | Potassium hydroxide | % | 3.9 | 3.8 | 3.8 | 3.9 | 3.9 | 4.0 |
| | Sodium silicate | % | 3.9 | 3.8 | 3.8 | 3.9 | 3.9 | 4.0 |
| | Unbleached wood chips | % | 14.7 | 14.7 | 14.7 | 14.8 | 14.8 | 0 |
| | Bleached wood chips | % | 0 | 0 | 0 | 0 | 0 | 12.0 |
| | Polyallylamine | % | 0.7 | 1.5 | 1.5 | 0 | 0 | 0 |
| | Subtotal | % | 100.0 | 100.0 | 100.0 | 100.0 | 100.0 | 100.0 |
| | Curing conditions | | Heating at 80° C. | Heating at 80° C. | Heating at 80° C., followed by autoclave at 165° C. | Heating at 80° C. | Heating at 80° C., followed by autoclave at 165° C. | Heating at 80° C., followed by autoclave at 165° C. |
| Physical properties | Specific gravity | | 1.38 | 1.39 | 1.36 | 1.35 | 1.36 | 1.25 |
| | Flexural strength | N/mm$^2$ | 12.4 | 11.5 | 12.4 | 11.8 | 12.5 | 11.1 |
| | Deflection | mm | 0.90 | 0.87 | 0.86 | 0.84 | 0.89 | 0.53 |
| | Leaching test (color difference) | ΔE | 18.1 | 7.6 | 25.4 | 44.2 | 72.7 | 71.2 |

The inorganic boards of Comparative examples 1 and 2, which contained no polyallylamine as the aggregating agent, were not problematic in terms of specific gravity, flexural strength and deflection, but exhibited large color differences values, of 44.2 and 72.7, respectively, in the leaching test. The components of the wooden reinforcing material and so forth leached thus readily from the inorganic boards. The inorganic board of Comparative example 3, which contained no polyallylamine as the aggregating agent and contained bleached wood chips, exhibited small deflection and a large value of color difference, namely 71.2, in the leaching test. The components of the wooden reinforcing material and so forth leached thus readily from the inorganic board.

By contrast, the inorganic boards of Examples 1 to 3 were comparable to the inorganic boards of Comparative examples 1 and 2 as regards specific gravity, flexural strength and deflection, but exhibited fairly smaller values of color difference in the leaching test, namely 7.6 to 25.4, as compared with the inorganic boards of Comparative examples 1 to 3. This indicates that the inorganic boards of Examples 1 to 3 are not problematic in terms of physical properties, and that components of the wooden reinforcing material and so forth leach less readily than in the inorganic boards of Comparative examples 1 to 3.

Embodiments of the present invention have been explained above, but the present invention is not limited thereto, and can be embodied in various manners without departing from the scope of the invention as defined in the appended claims.

As explained above, the present invention succeeds in providing an inorganic board, and a manufacturing method thereof, in which the inorganic board boasts low specific gravity and substantial deflection, and in which extraction and leaching of components from a wooden reinforcing material are suppressed even if the inorganic board contains an aluminosilicate setting material and a wooden reinforcing material.

What is claimed is:

1. An inorganic board comprising:
    an aluminosilicate setting material;
    a wooden reinforcing material; and
    an aggregating agent, wherein
    the wooden reinforcing material is covered by the aggregating agent and the aggregating agent is covered by the aluminosilicate setting material, and
    the aggregating agent is polyallylamine.

2. The inorganic board according to claim 1, wherein the aggregating agent content ranges from 1 to 30 wt %, on solids basis, with respect to the wooden reinforcing material.

3. The inorganic board according to claim 1, wherein the aluminosilicate setting material content ranges from 30 to 98.95 wt % with respect to total solids, the wooden reinforcing material content ranges from 1 to 30 wt % with respect to total solids, and the aggregating agent content ranges from 0.05 to 9 wt % with respect to total solids.

4. The inorganic board according to claim 2, wherein the aluminosilicate setting material content ranges from 30 to 98.95 wt % with respect to total solids, the wooden reinforcing material content ranges from 1 to 30 wt % with respect to total solids, and the aggregating agent content ranges from 0.05 to 9 wt % with respect to total solids.

5. A method of manufacturing an inorganic board, comprising the steps of:
    covering a wooden reinforcing material with an aggregating agent;
    producing a starting material mixture by mixing the thus-obtained wooden reinforcing material with an aluminosilicate powder, an alkali metal hydroxide and water glass, so that the aggregating agent is covered by an aluminosilicate setting material; and
    molding and curing the thus-obtained starting material mixture, wherein
    the aggregating agent is polyallylamine.

6. The method of manufacturing an inorganic board according to claim 5, wherein in the step of covering the wooden reinforcing material with the aggregating agent, the aggregating agent is added in an amount ranging from 1 to 30 wt %, on solids basis, to the wooden reinforcing material.

7. The method of manufacturing an inorganic board according to claim 5, wherein
    in the step of producing the starting material mixture
    the wooden reinforcing material content ranges from 1 to 30 wt % with respect to total solids,
    the aggregating agent content ranges from 0.05 to 9 wt % with respect to total solids, and
    the total content of the aluminosilicate powder, the alkali metal hydroxide and the water glass ranges from 30 to 98.95 wt % with respect to total solids.

8. The method of manufacturing an inorganic board according to claim 6, wherein
   in the step of producing the starting material mixture
     the wooden reinforcing material content ranges from 1 to 30 wt % with respect to total solids,
   the aggregating agent content ranges from 0.05 to 9 wt % with respect to total solids, and
   the total content of the aluminosilicate powder, the alkali metal hydroxide and the water glass ranges from 30 to 98.95 wt % with respect to total solids.

9. The method of manufacturing an inorganic board according to claim 5, wherein
   in the step of producing the starting material mixture, water content of the starting material mixture ranges from 5 to 30 wt %, on total solids basis.

10. The method of manufacturing an inorganic board according to claim 7, wherein
   in the step of producing the starting material mixture, water content of the starting material mixture ranges from 5 to 30 wt %, on total solids basis.

\* \* \* \* \*